United States Patent [19]

Saligny

[11] 4,262,173
[45] Apr. 14, 1981

[54] CONNECTING BLOCKS FOR TELEPHONE SYSTEMS

[75] Inventor: Yves Saligny, Cluses, France

[73] Assignee: Establissements Carpano & Pons, Cluses, France

[21] Appl. No.: 19,553

[22] Filed: Mar. 12, 1979

[30] Foreign Application Priority Data

Apr. 10, 1978 [FR] France ................ 78 11006

[51] Int. Cl.³ .............................................. H04Q 1/14
[52] U.S. Cl. .................................. 179/98; 179/1 PC; 361/428
[58] Field of Search ................ 179/1 PC, 1 C, 91 R, 179/91 A, 98; 339/17 M, 17 N, 18 C, 18 P, 198 R, 217 PS; 361/394, 426, 428, 429

[56] References Cited

U.S. PATENT DOCUMENTS

| | | | |
|---|---|---|---|
| 3,226,669 | 12/1965 | Lutz | 179/98 |
| 3,755,630 | 8/1973 | Boyer | 179/98 |
| 3,945,706 | 3/1976 | Steiner et al. | 339/17 C |
| 4,146,755 | 3/1979 | Causse | 179/98 |

FOREIGN PATENT DOCUMENTS

| | | | |
|---|---|---|---|
| 2048104 | 4/1972 | Fed. Rep. of Germany | 179/98 |
| 2264079 | 7/1974 | Fed. Rep. of Germany | 361/428 |
| 2643186 | 10/1977 | Fed. Rep. of Germany | 179/98 |
| 2643046 | 3/1978 | Fed. Rep. of Germany | 179/98 |

*Primary Examiner*—Bernard Konick
*Assistant Examiner*—Randall P. Myers
*Attorney, Agent, or Firm*—Robert E. Burns; Emmanuel J. Lobato; Bruce L. Adams

[57] ABSTRACT

A connecting block for telephone systems comprises insulating supports carrying input and output terminals for connecting the wires of the telephone lines. It comprises a case provided with guides cooperating with ribs formed on insulating plates. Each insulating plate carries on its inner face one input terminal and one output terminal. Each input terminal has an extension which, in the inoperative condition, contacts an extension of the corresponding output terminal. Channels are formed on the plate for facilitating the insertion of the wires having their ends connected to the input terminals, the same applying to the output terminals.

16 Claims, 9 Drawing Figures

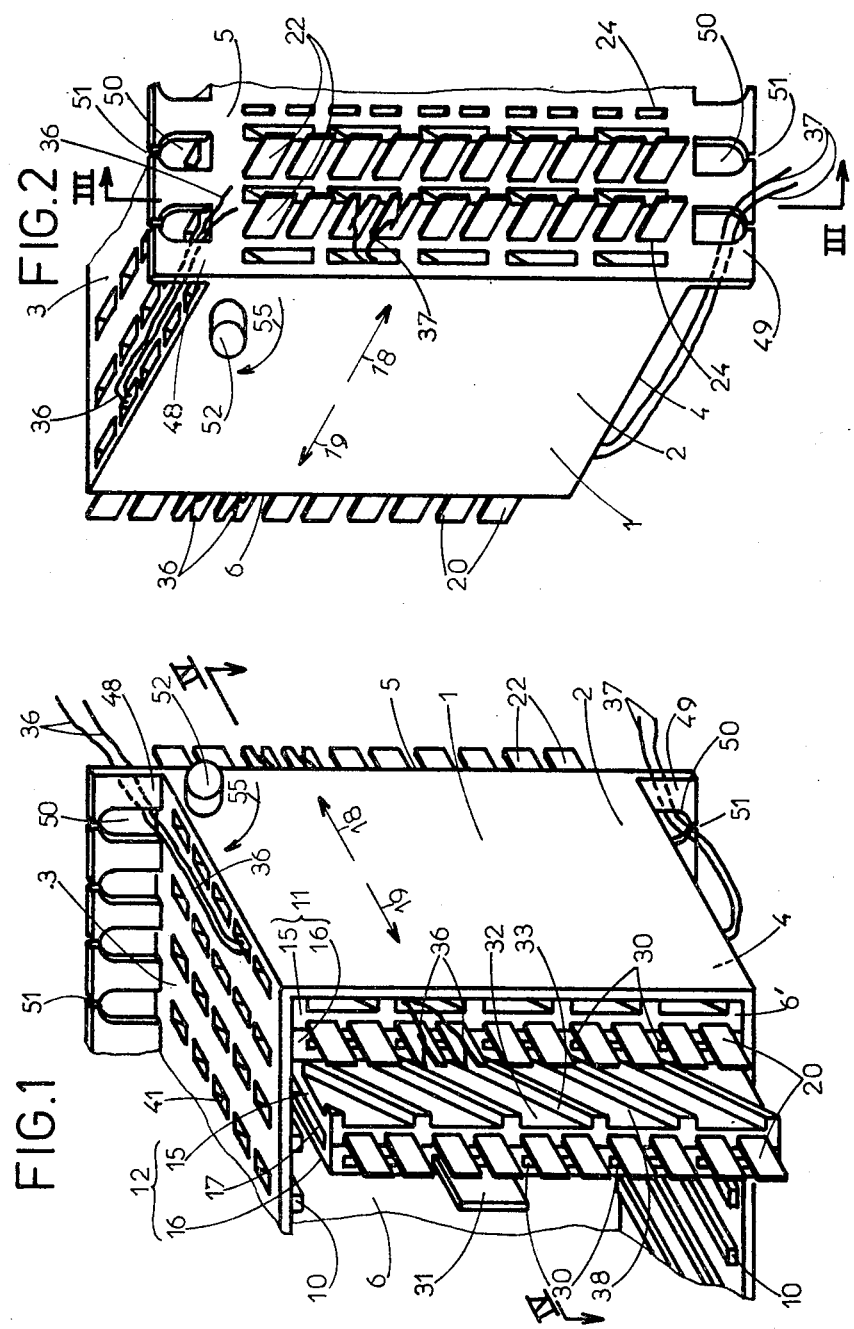

CONNECTING BLOCKS FOR TELEPHONE SYSTEMS

FIELD OF THE INVENTION

This invention relates to connecting blocks for telephone systems, which comprise a frame structure supporting insulating supports disposed side by side on the frame structure. These insulating supports carry rows of conducting input terminals and rows of conducting output terminals protruding from at least one of the free sides of said supports, each input terminal being connected or adapted to be connected to the corresponding output terminal. The same insulating supports also carry rows of channels opening each at their first end in the vicinity of at least one of the protruding terminals and at their other end along anyone of the free sides of the insulating supports which is perpendicular in relation to the support or supports carrying the protruding terminals.

DESCRIPTION OF THE PRIOR ART

In known connecting blocks of this character, such as those disclosed in the U.S. Pat. No. 3,945,706, the frame structure supporting the insulating supports is a U-shaped structure having therefore a moderate rigidity, and this insufficient rigidity must be compensated by a greater stiffness and consequently an increased volume of the insulating supports. Now, these supports have a relatively complicated structure, since they support each a row of input terminals and a row of output terminals. On the other hand, the aforesaid channels are formed in insulating supports separate from the abovementioned insulating supports, and they are also relatively complicated since two rows of channels comprises two insulating supports coupled side by side and separated by a partition-like insert. The structure of this connecting block is therefore relatively complicated and assembling the frame and the various component elements supported thereby is a relatively long and tedious operation.

SUMMARY OF THE INVENTION

The object of this invention is to provide a connecting block of simpler design and having a reduced volume in comparison with the prior art, and to this end the connecting block according to this invention comprises a relatively rigid frame in which the insulating supports are adapted to be fitted easily and rapidly. The connecting block according to the invention is characterized in that the frame thereof consists of a substantially prismatic case open completely on only one face or only two of its opposing faces, the parallel guide means opening at least one of these faces, and that at least some of the insulating supports consist of insulating plates cooperating by pairs and adapted to slide in said guide means, each pair of insulating plates being adapted to hold between the two opposing and registering faces of the two plates forming this pair a row of conducting input terminals and the corresponding row of conducting output terminals, each row of channels consisting on the one hand of ribs formed on the outer face of at least one of the plates of each pairs, and on the other hand of one face of an adjacent plate.

The prismatic case may be open on only one face or on two of its opposing faces.

According to a preferred form of embodiment of the connecting block constituting the object of the invention and wherein the case is open on only one face, the rows of input terminals and the rows of output terminals project from the case either all from its fully open face or through orifices formed in the case face opposing the open face, or the ones from the fully open face of the case and the others through orifices formed in the case face opposing the open face, other orifices being formed in the case which register with each end, respectively, of the channels opening against the solid faces of the case.

According to another form of embodiment of the invention, one of the plates of said pair carries on its inner face a row of input terminals and a row of output terminals, both rows being disposed on the two opposing free sides of said plate. Each input terminal comprises a conducting extension registering with a conducting extension of the corresponding output terminal. A row of orifices is contemplated either in the face of the case which is opposite the open face thereof, if the case is open on one face only, adjacent the orifices provided for the passage of the projecting terminals, or through a free side of at least one of the two plates of the pair, adjacent the projecting terminals. The position, shape and dimensions of each orifice are such as to permit the passage of an insulating element or a conducting element, adapted to cooperate with the corresponding extensions of at least one input terminal and of the corresponding output terminal. The ribs constituting said channels are formed only on the outer surface of one of the two plates of the pair.

According to a modified version of the above-described form of embodiment of the invention, it is not only one but both plates of the pair that support a row of input terminals and a row of output terminals. In this form of embodiment, the two plates of the pair support on their inner face one row of input terminals and one row of output terminals, respectively.

According to another modified form of embodiment of this invention, one of the plates of the pair concerned carries on its inner face a row of input terminals and a row of output terminals, these rows being disposed on two free sides, opposing each other, of said insulating plate. Each input terminal is connected to the relevant output terminal by means of a common conducting extension. The channel forming ribs are provided only on the outer face of one of the two plates of the pair involved.

In a further form of embodiment, each row of input terminals and the corresponding row of output terminals register with each other on only one of the free sides of the plates constituting the insulating supports. The two insulating plates constituting each pair of plates carry on their inner faces one row of input terminals and one row of output terminals, respectively, together with the corresponding conducting extensions provided on the input and output terminals, respectively. Each input terminal extension registers with an extension of the corresponding output terminal. A row of orifices is provided between each row of input terminals and the corresponding row of output terminals; each orifice is shaped and dimensioned to allow the passage of an insulating element or a conducting element, adapted to cooperate with the extensions of the relevant conducting elements of at least one input terminal and of the corresponding output terminal. These orifices are formed in the face face opposing the open face of the case, if the latter is open on only one face, between the orifices provided for the corresponding projecting input and output terminals. The channel forming ribs are provided on the relevant external faces of the two plates of each pair; the channels thus formed are closed by additional sliding plates each disposed between two adjacent pairs of plates.

According to a modified version of the preceding form of embodiment, the orifices contemplated for the passage of an insulating element or a conducting element through each of them are not formed in the case face opposing the open face but through the free side of at least one of the two plates, between the corresponding input and output relief terminals.

According to another modified version, each row of input terminals and the corresponding row of output terminals register with each other on a single free side of the plates constituting the insulating supports. The two insulating supports of each pair carry on their inner faces a row of input terminals and a row of output terminals, respectively. Each input terminal is connected to the corresponding output terminal by means of a common bridge-shaped conducting extension. The channel forming ribs are formed on the respective outer faces of the two plates of each pair; the channels thus formed are closed by additional sliding plates each disposed between two adjacent pairs of plates.

In some forms of embodiment, the insulating plates of each pair are slidably mounted in the case, independently of one another. In other forms of embodiment, the plates of each pair are held against each other and adapted to slide together in the case, the latter thus maintaining these plates in side by side relationship. In further possible forms of embodiment, the plates of each pair are assembled to each other, after fitting the terminals in position, for example by riveting or welding, and each pair of plates is adapted to slide bodily within the case.

In some forms of embodiment comprising input terminals and output terminals disposed on two opposing free sides, respectively, of the plates, and these plate advantageously but not compulsorily comprise channel forming ribs disposed at least parallel to each other and covering substantially completely the external faces of said plates. Some of the ribs constitute channels connecting a first free side of the plates supporting the input terminals to one of the free sides of said plates, which is perpendicular to the first side; other ribs constitute channels connecting the second free side of the plates which is opposite the first one and supports the output terminals, to the fourth free side of said plates, which is perpendicular to the first and second sides.

BRIEF DESCRIPTION OF THE DRAWINGS

FIG. 1 illustrates in fragmentary perspective view a connecting block according to this invention, with its front face facing the observer;

FIG. 2 is a fragmentary perspective view of the same form of embodiment of the invention, but with the front face disposed at the rear;

DESCRIPTION OF THE PREFERRED EMBODIMENTS

Figure 3:
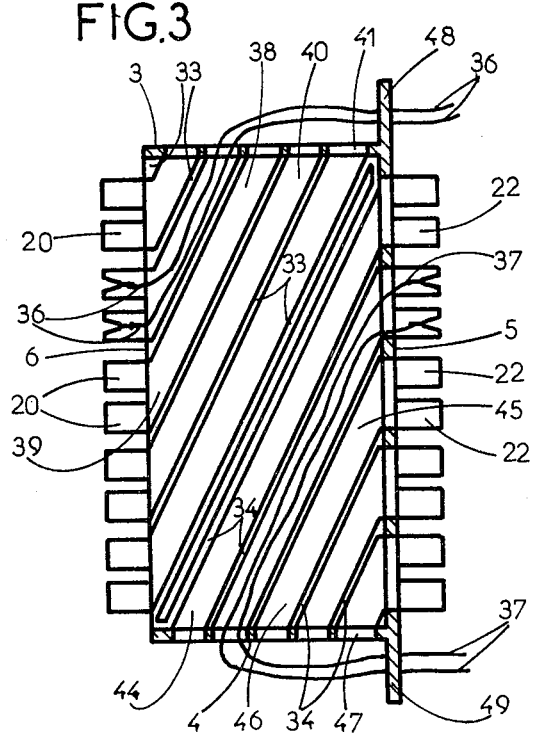
FIG. 3 is a section taken along the plane III—III of FIG. 2, of the same form of embodiment.

As illustrated in FIGS. 1 to 4 of the drawings, the connecting blocks according to the invention comprises a case 1 made preferably of molded plastic material and having rectangular faces throughout in this example. The faces of case 1 include opposing end walls 2, of which only one is shown in the drawings, and these walls 2 are disposed vertically. The connecting block also comprises a vertical rear wall 5 and opposite horizontal side walls, namely an upper side wall 3 and a lower side wall 4. The sixth face 6 of the case is open completely. Relief parallel guide means 10 are provided inside the walls 3 and 4, and terminate at the front face 6.

Figure 4:
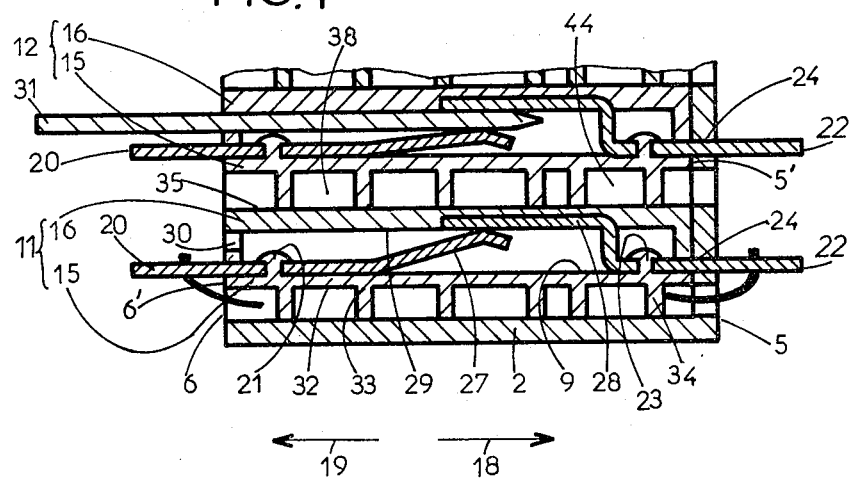
FIG. 4 is a fragmentary section taken along the line IV—IV of FIG. 1.

Disposed side by side within the case 1 are pairs 11, 12 . . . n of insulating plates 15 and 16 (FIGS. 1 and 4). Each pair of plates comprises a hollow guide means 17 having a cross section conjugate with that of the corresponding relief guide means 10 on which each pair 11, 12 . . . n can slide freely in the directions shown by the arrows 18 and 19 in FIGS. 1, 2 and 4. This hollow guide means 17 is provided for example between the plates 15 and 16 of each pair (FIG. 1). Each plate 15 carries on its inner face 9 (FIG. 4) a row of conducting input terminals 20 riveted at 21 (FIG. 4) and protruding from the free side 6' of the plate and from the open face 6 of case 1, when the plates 15 are housed in this case 1. The same insulating plates 15 also carry each, on the same inner face 9, a row of conducting output terminals 22 riveted at 23 and protruding from the free side 5' opposite the side 6' of the plate, and outside the wall 5 of case 1 when the plates 15, 16 are housed in this case 1. Orifices 24 are formed through the wall 5 to permit the passage of each output terminal 22. The two plates 15, 16 constituting each pair 11, 12 . . . n of plates are held in proper positions with respect to each other for example by means of suitable centering studs (not shown); thus, when one pair of plates is slipped home on the corresponding guide means 10, it is not possible to remove one plate without removing the other.

Each input terminal 20 comprises a conducting extension 27 suitably curved and prestressed for engaging, when inoperative, a conducting and registering extension 28 of the corresponding output terminal 22. This extension 28 is preferably bent twice at right angles (see FIG. 4) so as to be pressed against the lower face 29 of the corresponding insulating plate 16.

Each plate 16 comprises a row of orifices 30 formed through its free side 6' adjacent the input terminals 20. In this example, one orifice 30 is provided adjacent each pair of adjacent input terminals 20 adapted to be used with the two wires of a same line, for example. Each orifice 30 has such shape and dimensions that it permits the passage of an insulating element 31 (FIGS. 1 and 4) adapted to be moved manually at will in the directions 18 or 19.

Furthermore, each plate 15 has formed on its outer face 32 ribs 33 and 34 constituting, together with said outer face 32 and the external face 35 of the adjacent plate 16 of the pair considered in this specific example, channels or passages having dimensions sufficient for accommodating the connecting wires 36 and 37. The channels formed by the ribs 33 and 34 of the first plate 15 of the row (FIG. 4) are closed by the end wall 2 of case 1. As shown notably in FIG. 3, the ribs 33 are substantially parallel to each other and form channels 38 opening each at their first ends 39 in the vicinity of a pair of adjacent input terminals 20, and at their other ends 40 along the upper wall 3 of case 1. Orifices 41 are formed in this wall 3 which register with the second end 40 of each channel 38. Similarly, the ribs 34 are also substantially parallel to each other and constitute channels 44 opening each at their first ends 45 in the vicinity of two adjacent output terminals 22 and at their other ends 46 along the lower wall 4 of case 1. Orifices 47 are also formed in this wall 4 and register with the other ends 46 of said channels 44, respectively.

The rear wall 5 of case 1 advantageously comprises a pair of extensions 48, 49 disposed above and beneath the case 1, respectively. Each extension 48, 49 carries a row of wire passages consisting of holes 50 connected to the outer edges of these extensions 48, 49 by means of slots 51.

Each end wall 2 of case 1 supports a projecting pivot stud 52 on its external face, and each pivot stud 52 is adapted to engage a corresponding bearing (not shown) so that the complete connecting block can be rotated at will to a certain extent.

When assembling the connecting block, the pairs 11, 12 . . . n of plates are inserted in the direction 18 into the relevant case 1, as shown notably in FIG. 1. Each pair of line wires 36 is subsequently introduced (see FIGS. 1 to 4) into the proper orifice 41 and then into the corresponding channel 38 during the wiring operation, and the end of each one of the two wires 36 is connected to one of the two registering input terminals 20 of the first end 39 of channel 38. The wires 36 are then passed through the corresponding hole or wire passage 50 by using the slot 51 provided for this purpose. Similarly, the two wires 37 are introduced into the proper orifice 47, then into the channel 44 corresponding thereto, and the end of each wire 37 is connected to one of the two output terminals 22 registering with each other at the first end 45 of channel 44. The wires 37 are then passed through the corresponding hole 50 of extension 49, and the same procedure is applied to all the other pairs of wires 36 and 37.

Should a pair of plates 15, 16 be subsequently damaged, its replacement is extremely easy since it is only necessary to disconnect the wires 36 from the input terminals 20, then cause the complete connecting block to pivot as shown by the arrow 55 in FIG. 1, and finally disconnect the wires 37 from the output terminals 22. The pair of plates may then be moved manually in the direction towards the arrow 19, and another pair of plates may be introduced in lieu thereof. Under these conditions, the wires 36 and 37 are reconnected to the corresponding terminals and the connecting block is restored to the position shown in FIG. 1. The same rotation in the direction towards the arrow 55 may also be accomplished when it is only required to disconnect the wires 37 from the output terminals 22. This rotational movement is not compulsorily necessary when wiring the complete block, for the output terminals 22 may be wired before fitting the blocks on the racks, for example of a distributor-frame, supporting a plurality of these blocks disposed side by side. In this form of embodiment, the conducting extensions 27 and 28 of the input and output terminals 20, 22 contact each other in the inoperative condition. When it is desired to disconnect or cut off certain lines, it is possible to insert an insulating element 31 (FIGS. 1 and 4) into the orifice 30 provided for this purpose. As shown in FIG. 4, the extensions 27 and 28 are thus spaced from each other. In this example, the extensions corresponding to the two wires 36 and 37 of a same line are thus separated by a single insulating element 31.

It will be seen that a connecting block of this type can be assembled without difficulty, and also wired very easily, since the pairs of wires are properly guided in the channels, of very simple design, provided to this end.

According to a modified version of the first form of embodiment, not shown in the drawings, not all the terminals 20 and 22 are riveted to the insulating plates 15. In this modified version, the input terminals 20 are riveted to one of said plates 15, for example, constituting a pair of said plates, and the output terminals 22 are riveted to the other plate 16 of the same pair. Otherwise, the mode of operation of the assembly is unchanged.

Figure 5:
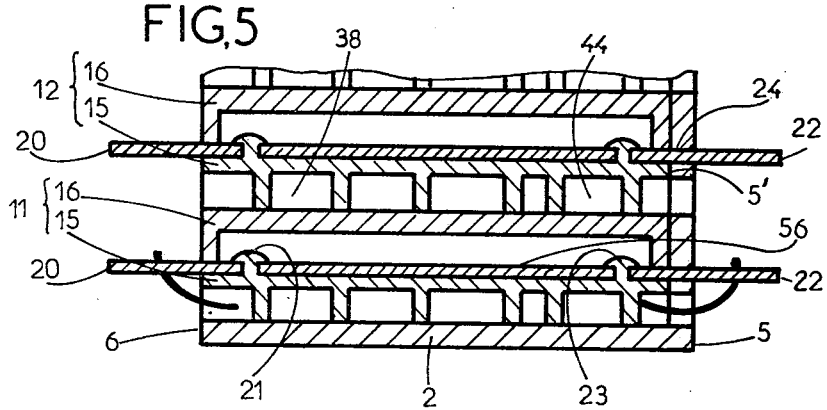
FIG. 5 is a fragmentary section similar to FIG. 4 but showing a second form of embodiment of the invention.

In the second form of embodiment illustrated in FIG. 5 the output terminals 20 and input terminals 22 are no more connected electrically via conducting extensions 27 and 28, respectively, but via a conducting extension 56 common to an input terminal 20 and to the relevant output terminal 22. The orifices 30 contemplated in the insulating plates 16 are advantageously dispensed with since the insulating element 31 is no more required, a permanent connection being established between terminals 20 and 22. All the other component elements ae identical with those of the preceding version. The mode of operation of the assembly is also similar to that of the first form of embodiment (FIGS. 1 to 4).

It would not constitute a departure from the basic principles of the invention to invert the input and output terminals 20 and 22 of FIGS. 1 to 5, the terminals 20 being the output terminals and the terminals 22 the input terminals. Similarly, the complete block could be inverted, so that the wall 5 would become the front wall and the open face 6 disposed at the rear of the block.

Figure 6:
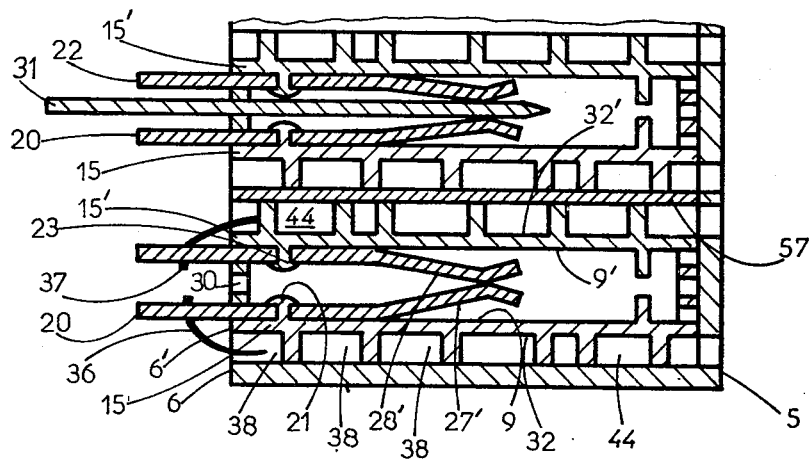
FIG. 6 is a fragmentary section similar to FIG. 4 showing a third form of embodiment of the invention.

In a third form of embodiment illustrated in FIG. 6, each row of input terminals 20 and the corresponding row of output terminals 22 register with each other on only one of the free sides, for example 6', of the insulating plates. Thus the input terminals 20 are riveted at 21 to the front face 9 of insulating plate 15, and the output terminals 22 are riveted at 23 to the inner face 9' of a relevant insulating plate 15'. In actual practice, the insulating plate 15' is a second insulating plate 15 which has been rotated through 180° before pressing it against the first plate 15. Each input terminal 20 and each output terminal 22 corresponding thereto comprise conducting extensions denoted 27' and 28' respectively, and these extensions are curved and prestressed so as to engage each other in the inoperative condition. Plate 15' comprises orifices 30 as in the first form of embodiment (FIGS. 1 to 4). Each orifice 30 is disposed between two adjacent input terminals 20, and the two corresponding output terminals 22 of the same pair of plates. The insulating plates 15 and 15', which are exactly identical with each other, will thus constitute pairs of plates comprising ribs on their two outer faces designated at 32 and 32', respectively. An insulating plate 57 is disposed between two adjacent pairs of plates so as to close at the same time the channels of a plate 15 and those of the plate 15' of the adjacent pair of plates. All the other component elements of the block are identical with those of the previously described form of embodiment.

When wiring the block, the wires 36 are introduced as disclosed in connection with the preceding case into the channels 38 of plates 15, the other end 40 of these channels (FIG. 3) opening at the upper side 3 of case 1; these wires 36 are each connected to an input terminal 20. On the other hand, the wires 37 are introduced into the channels 44 of plates 15' and open with their other ends 46 (see FIG. 3) at the lower wall 4 of case 1. Orifices formed in this wall 4 permit the insertion of the wires 37. The ends of these wires 37 are each connected to an output terminal 22.

As in the first form of embodiment (FIGS. 1 to 4) it is possible to introduce an insulating element 31 into an orifice 30, when it is desired to disconnect or cut off certain lines, by separating extensions 27' from extensions 28'.

In a modified version of this third form of embodiment (not shown in the drawings), the input and output terminals 20, 22 extend through the wall 5 of case 1 via orifices formed for this purpose therein. The same wall 5 also comprises orifices 30 adapted to be engaged by the insulating elements 31. In this case, the wall 5 is advantageously disposed at the front of case 1 and the open face 6 is at the rear of the case 1.

Figure 7:
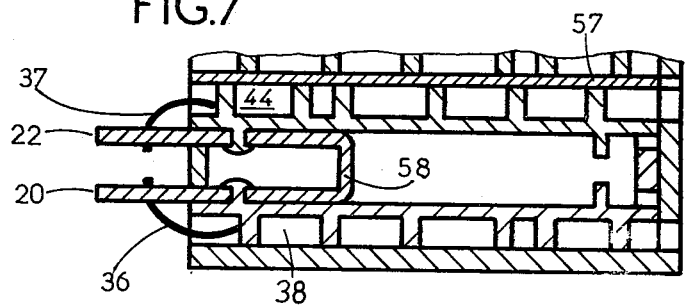
FIG. 7 is another fragmentary section similar to FIG. 4 showing a fourth form of embodiment of the invention.

According to a fourth form of embodiment illustrated in FIG. 7, the conducting extensions 27' and 28' of the preceding form of embodiment (FIG. 6) are replaced by a common, bridge-forming conducting extension 58. If the plates 15 and 15' of FIG. 6 are not used, the orifices 30 may be dispensed with since the insulating elements 31 cannot be used in this modified embodiment.

In a modification of the fourth form of embodiment (not shown in the drawings) the input and output terminals 20, 22 extend through orifices formed in the wall 5 of case 1. In this arrangement the wall 5 is advantageously disposed on the front of case 1 and the open side 6 is at the rear.

According to a modified version of the first form of embodiment (FIGS. 1 to 4) and also of the third form of embodiment (FIG. 6), the extensions 27 and 28, or 27' and 28', are spaced from each other in the inoperative condition, the electrical continuity between these extensions being provided for by conducting elements having a shape similar to that of the insulating elements 31. Similarly, whether the extensions 27 and 28, or 27', 28' are spaced or not from each other in the inoperative condition, it is possible to insert therebetween the terminals of a protection module as a substitute for the insulating element 31.

Figure 8:
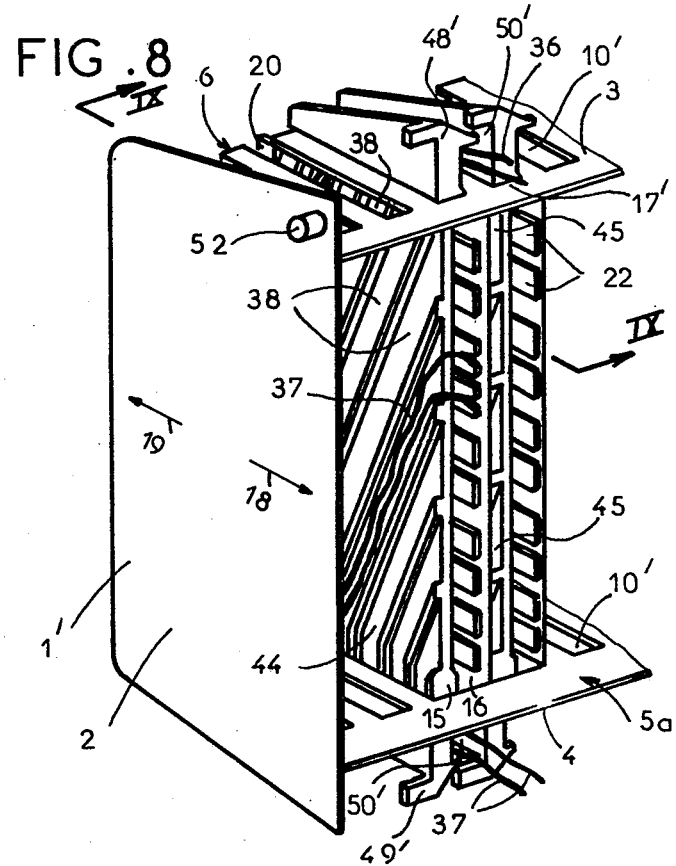
FIG. 8 is a perspective view similar to FIG. 2 showing a connecting block comprising a modified case applicable to the preceding forms of embodiment.
Figure 9:
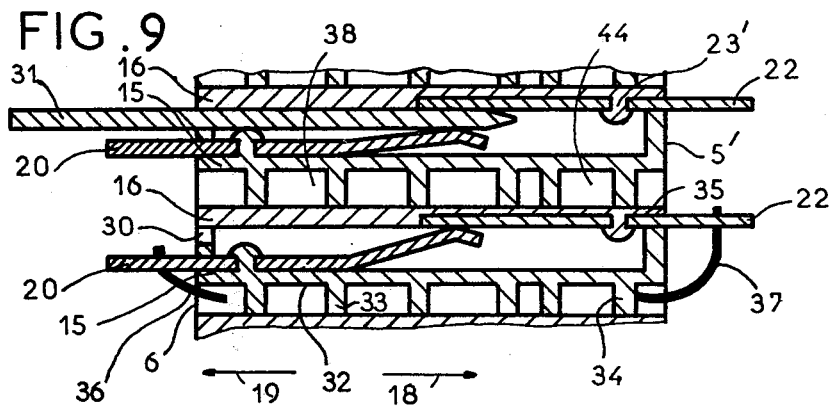
FIG. 9 is a fragmentary section taken along the line IX—IX of FIG. 8 showing a form of embodiment incorporating said modified case.

In a fifth form of embodiment shown in FIGS. 8 and 9, the connecting block comprises a case 1', for example of sheet metal, having likewise walls 2, 3 and 4, but without the vertical rear wall 5; in fact the corresponding rear face 5a of case 1', opposing the sixth fully open faces 6, is also fully open. The relief guide means 10 disposed inside the walls 3 and 4 are replaced by parallel notches 10' formed through the walls 3 and 4 and opening for example at the front face 6. Each pair of insulating plates 15 and 16 comprises laterally a hollow guide means 17' having a section conjugate with that of one side of a notch 10', to permit the sliding of said pair of plates in the directions towards 18 or 19. This guide means 17', in this example, is formed in plate 15. In the form of embodiment shown in FIG. 9 the plates 15 support the input terminals 20 as in the case illustrated in FIG. 6, but the conducting output terminals 22 are riveted at 23' to the insulating plate 16. In this form of embodiment, each row of orifices 41 and 47 formed through the walls 3 and 4 respectively is replaced in fact by a single orifice consisting of a notch 10' permitting the passage not only of the corresponding wires 36 and 37 but also of the corresponding ends of plates 15 and 16. On the other hand, the extensions 48 and 49 of case 1 of the preceding forms of embodiments are eliminated together with the wire passages 50, and replaced by the extensions 48' and 49' provided at the two ends of the insulating plates 15 and 16 outside the walls 3 and 4, these extensions being shaped to constitute wire passages 50' between them, the inlet end of these passages 50' being resiliently deformable to permit the insertion of the wires 36 and 37.

When the pairs of plates 15 and 16 are fitted into the case 1', the output terminals 22 projecting from said plates are easily and freely accessible from the rear face 5a of case 1'. The same applies to the ends 45 of channels 44 opening freely at the same face of said insulating plates 15 and 16.

All the other elements are identical with those of the first form of embodiment (FIGS. 1 to 4). The assembly operates exactly like this first form of embodiment.

The connecting block according to this invention may be used in telephone systems, notably as a means for connecting a cable end, or as a distribution strip.

Although specific forms of embodiment of this invention have been described hereinabove and illustrated in the accompanying drawings, it will readily occur to those skilled in the art that various modifications and changes may be brought thereto without departing from the basic principles of the invention as set forth in the appended claims.

What is claimed is:

1. A connecting block for telephone systems comprising:
   a prismatic case having opposed parallel end walls and opposed parallel first and second side walls connecting said end walls, at least one side of said case being open, and a plurality of parallel guide means on the inner face of said side walls, said guide means extending in from said open side and being parallel to said end walls,
   a plurality of pairs of insulating plates insertable in said case through said open side thereof, said plates being guided by said guide means, the two plates of each pair having inner faces facing one another and opposite outer faces,
   rows of conductive input terminals and corresponding output terminals between said plates of a pair and secured to at least one of said plates, said terminals having end portions projecting out beyond edges of said plates which are perpendicular to said side walls of said case, and means for electrically connecting said input terminals with corresponding output terminals,
   one of said plates of each of said pairs of plates having on its outer face a plurality of spaced parallel ribs forming a plurality of parallel channels extending from the vicinity of said projecting end portions of said input and output terminals to one or the other of said side walls to receive wires connected to said projecting end portions of said terminals, and said side walls of the case having openings through which said wires extend.

2. A connecting block according to claim 1, in which said case is open at only one of its sides and has a third side wall connecting said end walls at the side of said case opposite said open side.

3. A connecting block according to claim 2, in which all of said terminals extend out of said open side of said case.

4. A connecting block according to claim 2, in which said input terminals extend out of one side of said case and said output terminals extend from the opposite side of said case, said third side wall having openings for terminals extending from said third side of said case.

5. A connecting block according to claim 2, in which all of said terminals extend out of said third side of said case, said third side wall having openings through which said terminals extend.

6. A connecting block according to claim 1, in which said prismatic case is open at two opposite sides.

7. A connecting block according to claim 6, in which said input terminals extend from one open side of said case and said output terminals extend from the opposite open side of said case.

8. A connecting block according to claim 1, in which said input terminals and said output terminals are secured to the same insulating plate of a pair.

9. A connecting block according to claim 1, in which said input terminals are secured to one insulating plate of a pair and said output terminals are secured to the other insulating plate of said pair.

10. A connecting block according to claim 8 or 9, in which said input terminals overlap corresponding output terminals.

11. A connecting block according to claim 10 in which overlapping portions of said input terminals and output terminals are resilient and are normally in contact with one another, and in which an insulating element is insertable in said case between said overlapping portions to separate said input terminals and output terminals.

12. A connecting block according to claim 10, in which overlapping portions of said input terminals and output terminals are normally spaced from one another and in which a conducting element is insertable in said case between said overlapping portions to effect electrical conduction between said input terminals and corresponding output terminals.

13. A connecting block according to claim 9, in which said input terminals and corresponding output terminals are electrically connected with one another by bridge-like extensions thereof.

14. A connecting block according to claim 1, in which both of said plates of each said pair of plates have on their outer faces a plurality of ribs forming said wire-receiving channels, and in which additional plates of insulating material are insertable in said case between successive pairs of said pairs of plates.

15. A connecting block according to claim 1, in which at said case has projections projecting from said first and second side walls of said case, said projections providing wire passages to receive said wires extending through said openings in said first and second side walls.

16. A connecting block according to claim 1, in which pivot studs projecting from said end walls provide for pivotal mounting of said case for pivotal movement about an axis perpendicular to said end walls.

* * * * *